United States Patent [19]

Morrison

[11] Patent Number: 4,919,078
[45] Date of Patent: Apr. 24, 1990

[54] LITTER PACKAGING SYSTEM

[76] Inventor: Glenn E. Morrison, 1160 Francisco St., Berkeley, Calif. 94702

[21] Appl. No.: 277,970

[22] Filed: Nov. 30, 1988

[51] Int. Cl.⁵ .............................................. A01K 1/01
[52] U.S. Cl. ................................................. 119/1
[58] Field of Search .................................... 119/1

[56] References Cited

U.S. PATENT DOCUMENTS

| | | | |
|---|---|---|---|
| 3,890,930 | 6/1975 | Clark | 119/1 |
| 4,352,340 | 10/1982 | Stubelt | 119/1 |
| 4,711,198 | 12/1987 | Mossbarger | 119/1 |
| 4,760,816 | 8/1988 | Rhodes | 119/1 |
| 4,776,300 | 10/1988 | Braddock | 119/1 |
| 4,800,842 | 1/1989 | Jones | 119/1 |

Primary Examiner—John Weiss

[57] ABSTRACT

Pet litter packaging apparatus is disclosed which includes a rectilinear cardboard container whose flaps expand to form a litter box having an interior of sufficient size to accommodate a pet. Litter bags lie on their sides with their openings directed against a vertical door. Beams are used to hold the bags open and to support the flaps in a house-like configuration. The pet eliminates within the bags, which can be disposed of one after the other without the pet owner having to transfer the litter.

16 Claims, 1 Drawing Sheet

U.S. Patent
Apr. 24, 1990
4,919,078
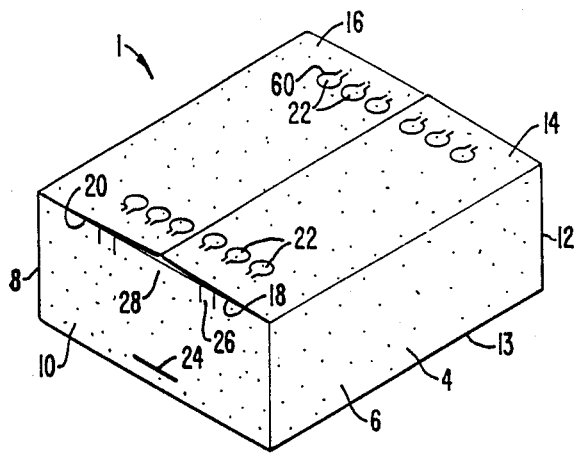
FIG._1.
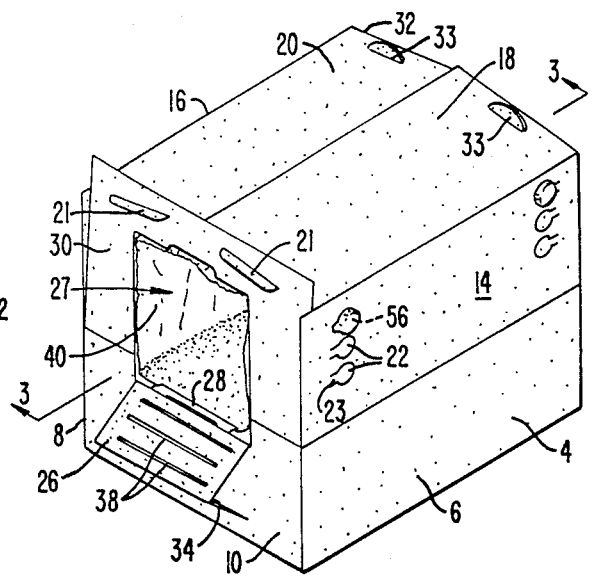
FIG._2.
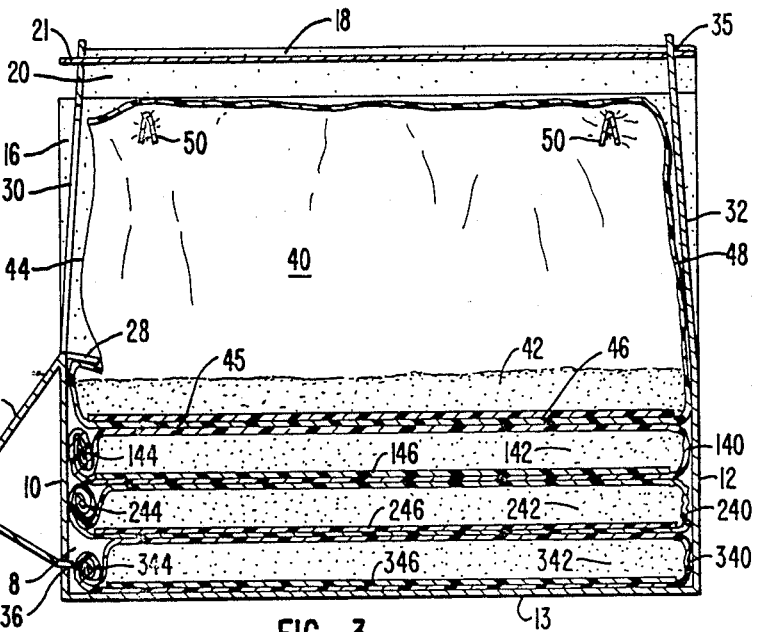
FIG._3.
FIG._6.
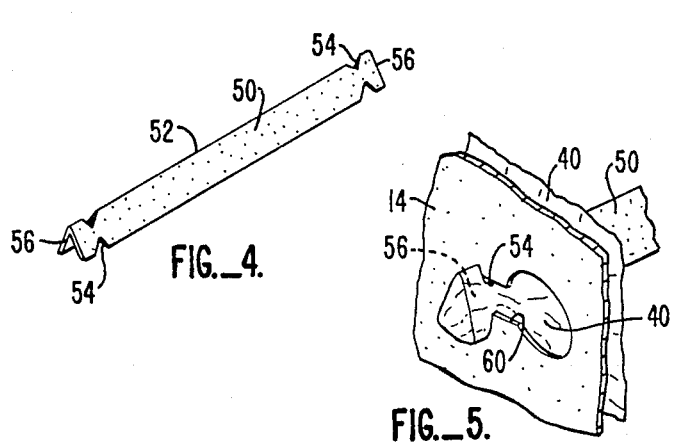
FIG._4.
FIG._5.
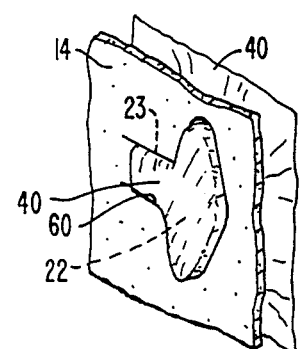
FIG._7.

LITTER PACKAGING SYSTEM

FIELD OF THE INVENTION

This invention relates to sanitary pet litter packaging, more particularly to a litter packaging and shipping container which unfolds into a litter box.

BACKGROUND OF THE INVENTION

Cats have recently become the nation's most common pet. Cats have overtaken dogs in recent years because the former are more adapted to the indoor living conditions imposed by the increased proportion of apartment and condominium residences, which do not have the private yards that larger dogs require in which to roam. Furthermore, cats can be trained to eliminate their wastes indoors and do not require outdoor walking.

However, indoor pet elimination has its drawbacks. While the use of absorbant granular pet litter has achieved almost universal acceptance, the litter is itself messy and unsanitary to change and dispose. In addition, not all waste is absorbed or mixed with the litter. Instead, waste often adheres to the sides and bottom of the litter box, necessitating periodic cleaning of the box itself. Odor is often a problem in open topped litter boxes. Finally, the cat's natural inclination to scratch often causes litter and waste to be thrown out of the box.

Considerable effort has thus been directed toward construction of a pet litter box which addresses these and other problems.

Prior developments in this field will be generally illustrated by reference to the following patents:

| U.S. Pat. No. | Patentee | Issue Date |
| --- | --- | --- |
| 3,890,930 | M. A. Clark | 06/24/75 |
| 4,352,340 | J. R. Strubelt | 10/05/82 |
| 4,348,982 | J. W. Selby | 09/14/82 |
| 4,739,725 | J. B. Fennelly | 04/26/88 |
| 4,732,111 | W. J. Runion | 03/22/88 |
| 3,752,120 | S. W. Pallesi | 08/14/73 |
| 4,299,190 | A. Rhodes | 11/10/81 |
| 3,872,832 | C. Quinn | 03/25/75 |
| 4,667,622 | D. S. Breault | 03/26/87 |
| 4,711,198 | G. R. Mossbarger | 12/08/87 |

U.S. Pat. No. 4,739,725 teaches the idea of multiple replacement units for animal litter boxes.

U.S. Pat. Nos. 4,732,111, 3,752,120, 4,299,190, and 4,352,340 teach replacement units for litter boxes in which liner units are disposable.

U.S. Pat. Nos. 4,348,982 and 3,890,930 teach peaked roof litter boxes wherein a single litter liner opens upwardly.

The rest of the patents are representative of what is in the art.

SUMMARY OF THE INVENTION

The present invention is a self-contained litter packaging, pet enclosure, and waste disposal system which comprises a compact rectilinear container when shipped. The cardboard or plastic container holds a plurality of bags of clean cat litter. When opened, the flaps of the sides of the box form walls and a roof. One of the walls has a punch out door which forms a ramp for the pet.

To use the device, one first opens the top flaps of the container and then the top litter bag, which has its opening packed on its side so as to face the door. Two support beams are inserted inside the open bag and the bag is raised toward the roof of the enclosure. The ends of the beams, with bag material wrapped around them, are inserted into opposing openings in the walls and project outwardly. The beams have notches in their ends and the openings have corresponding necks so that the beams secure the walls in an open and upright position while, at the same time, they hold the bag open. The pet may enter through the door and eliminate waste onto the litter which lies on the side of the bag. When the litter is full of waste, the bag, litter and all, is removed and discarded. One does not have to contact litter to dispose of soiled matter and the interior of the device will seldom, if ever, require cleaning. A new bag then is raised into position until all the bags are used up, at which time the enclosure may either be refilled or discarded.

The litter may be shipped in a container which is nearly full of litter in its folded state, thus minimizing bulk during shipment. At the same time, the shipping container doubles as a litter box whose use allows the pet owner to deal with waste problems without having to touch or pour litter. Furthermore, the litter is kept from being spread around by the pet.

FEATURES AND ADVANTAGES

An object of the invention is to provide a means of packaging pet litter which is compact, i.e. it utilizes a container which is of reduced size in an unexpanded shipping position and substantially entirely filled with litter yet which is expandable in use to create a void in its interior of sufficient size to accommodate a pet comfortably.

Another object of this invention is to provide a litter packaging and delivery system wherein the litter does not ever leave resealable plastic bags so that the pet owner does not have to touch soiled litter.

A further object is to direct the pet into the plastic litter bag through a narrow door opening so that it does not scatter litter or soil the container supporting the bag. Accordingly, there is disclosed a mechanism for storing litter on what is normally the side of a bag, rather than the bottom thereof, where the bag opens onto a vertical plane to a side door which is readily accessible to a small pet.

Yet another object is to disclose means for using the foldable flap panels of a cardboard container to form the walls and roof of the expanded litter box. Support beams, as well as a tab and slot arrangement, are disclosed for stabilizing the box in the expanded configuration.

Important secondary features of the invention include a pet entrance ramp, a litter deflector guard, and multiple support openings at different heights for the beams.

Other novel features which are characteristic of the invention, as to organization and method of operation, together with further objects and advantages thereof will be better understood from the following description considered in connection with the accompanying drawing in which a preferred embodiment of the invention is illustrated by way of example. It is to be expressly understood, however, that the drawing is for the purpose of illustration and description only and is not intended as a definition of the limits of the invention.

Certain terminology and derivations thereof may be used in the following description for convenience in reference only and will not be limiting. For example, the words "upwardly," "downwardly," "leftwardly," and "rightwardly" will refer to directions in the drawings to which reference is made. The words "inwardly" and "outwardly" will refer to directions toward and away from, respectively, the geometric center of a device and designated parts thereof.

BRIEF DESCRIPTION OF THE DRAWING

FIG. 1 is an isometric view of a preferred embodiment of my invention shown folded for shipping;

FIG. 2 is an isometric view of the device of FIG. 1 shown unfolded and assembled for pet use;

FIG. 3 is a transverse sectional elevation taken along the plane of line 3—3 of FIG. 2;

FIG. 4 is an isometric view of a beam of the device of FIG. 1;

FIG. 5 is an enlarged fragmentary sectional view showing support of a litter bag by a beam;

FIG. 6 is an enlarged fragmentary sectional view of one of the support ears of the device; and FIG. 7 is an enlarged fragmentary sectional view showing support of a litter bag by an ear.

DRAWING REFERENCE NUMERALS 1 litter packaging system
4 container
6 right side wall of 4
8 left side wall of 4
10 front wall of 4
12 rear wall of 4
13 floor of 4
14 flap of 6
16 flap of 8
18 roof arm of 14
20 roof arm of 16
21 tabs of 18, 20
22 ears
23 neck of 22
24 slot
26 ramp
27 door
28 deflector
30 front gable flap
32 rear gable flap
33 tabs of 32
34 leg of 26
36 tab of 34
38 slits in 26
40 bag
42 litter
44 opening of 40
45 lower side of 40
46 support plate
48 bottom of 40
50 beam
52 score in 50
54 notches in 50
56 lugs
60 throat opening
140 bag
142 litter
144 opening of 140
146 support plate
240 bag
242 litter
244 opening of 240
246 support plate
340 bag
342 litter
344 opening of 340
346 support plate

DESCRIPTION OF A PREFERRED EMBODIMENT

Referring to FIG. 1, there is illustrated therein a litter packaging system 1 of my invention. In FIG. 1 the system 1 is shown folded for convenient storage, shipping and retail shelf display.

An outer container 4, preferably made of cardboard, thermoplastic laminated cardboard, or other rigid lightweight planar material, is a rectilinear sextahedron having right 6 and left 8 vertical side walls and front 10 and rear 12 vertical end walls. The floor 13 of the container 4, not illustrated, is of conventional cardboard box construction, i.e. overlapping planar flaps sealed with tape, glue, staples or the like.

The top of the container is formed from right side wall flap 14 and left side wall flap 16, whose top edges are contiguous when they are in the folded position shown in FIG. 1.

Flaps 14,16 extend into planar right 18 and left 20 roof arms, respectively (as best seen in FIG. 2). The roof arms are folded and stowed underneath the side flaps when the container 4 is in the unassembled position. The entire container may be constructed using standard die stamping and folding methods.

FIGS. 2 and 3 illustrate the packaging system in a second unfolded and assembled position. The side flaps 14,16 are unfolded to extend vertically upward. The roof arms 18,20 are unfolded into slightly upwardly inclined and inwardly directed positions wherein their outer edges are contiguous, forming a peaked roof of the container 4. Front 30 and rear 32 gable flaps are unfolded from their prior positions beneath the side flaps 14,16 into upright positions.

At this point, at least one and preferably two support beams 50 are removed from the interior of the container. Turning briefly to FIG. 4, it can be seen that each beam preferably is formed of flat cardboard that is scored along a line 52 so that it may be readily folded into a triangular shape fit for supporting loads. Notches 54 are die cut into the end regions of the beam, creating end lugs 56. Alternatively, preformed wooden or plastic posts could be substituted as support beams.

A plurality of thermoplastic bags 40,140, 240,340 . . . (like portions of like bags bear like reference numbers) filled with litter 40,140 . . . are stored on their sides within the container 4. For convenience, the portions of a bag will be referred to in conventional terms, although, strictly speaking, the orientation of the bags would require relabeling; i.e. vertical portion 48 is called the "bottom" of the bag 40, horizontal portion 45 is called the lower "side," and vertically extending opening 44 is called the "top."

The uppermost litter bag 40 is opened from its forward facing curled or folded top opening 44 and is billowed upwardly. To support the bag 40 and the side wall flaps 14,16, the beams 50 are inserted inside the bag 40 and pressed from the inside of the container out through narrow throated openings 60 stamped in the side flaps.

The cooperation between the beam 50, the wall of the bag 40 and the side wall flap 14 is shown in the enlarged fragmentary view of FIG. 5. The lug 56, which is wrapped in bag material, may pass through the enlarged portion of opening 60 and be drawn back so that the notch 54 engages within the throat of opening 60. Lug 56 then cannot be pulled straight back through the opening. Therefore, the bag and flap are held tight.

Other means of holding litter bags open within the container 4 may be substituted. For example, it can be seen in FIG. 6 that the opening 60 may be formed by die stamping an ear 22 having a neck 23. In cooperation with a beam 50 as described above, the ear is pushed back out of the way within the container 4 or is removed entirely. However, as shown in FIG. 7, wall material of bag 40 may be directly inserted through the opening 60 and the ear then pulled back through the opening from the inside to the outside of the container to grasp and support the bag 40.

In yet another embodiment (not illustrated) tape may be used to adhere the bags to the wall flaps at the regions where the ears 22 otherwise would have been punched. However, use of support means such as beams 50 is presently preferred insofar as such beams provide structural support to the unfolded container, which support is absent in the latter two embodiments.

Returning to FIGS. 2 and 3, assembly continues as follows. After the beams 50 are holding the bag 40 in an open billowed state and are holding the wall flaps 14,16 in upright positions, the tabs 21 of roof arms 18,20 are inserted into slots punched into the front gable flap 30 and the tabs 33 of rear gable flap 32 are inserted into slots punched into roof arms 18,20. As will be readily apparent from the drawing, other combinations of roof arm tabs with gable slots and/or roof arm slots with gable tabs may be substituted for the combination shown.

Die stamped into the front wall 10 of the container 4 and extending upwardly into the front gable flap 30 is a portion which may be pulled outwardly to form a door opening 27 and a ramp 26, the latter of which assists the ingress and egress of kittens and other small pets. The ramp has a backwardly foldable leg 34 terminating in a tab 36. To support the ramp, the tab 36 may be inserted into a slot 24 (best seen in FIG. 1) punched into the front wall 10. Slits or scores 38 may be formed on the upper surface of the ramp 26 for traction. Alternatively, for larger animals, or once the pet has become familiar with the system 1, the ramp portion may be torn off.

Die stamped in the same area, i.e. the junction or fold between the front wall 10 and gable flap 30, is a deflector guard 28. As noted, pulling the ramp 26 outward creates the door 27 for the pet to enter within the interior of the litter bag 40. Pushing the deflector 28 inward covers a lower portion of the bag opening 44 to prevent the litter 42 from being scattered out the door 27 when the cat scratches. The deflector also acts to hold the lower edge of the bag in place.

As stated, a particularly useful feature of the device is the inclusion of multiple bags of litter 40, 140,240 . . . stacked one on top of the other on top of the container floor 13.

A support plate 46 made of cardboard or plastic may be inserted into the bag 40 between the litter 42 and the lower "side" (now bottom) 45 of the bag. While the plates 46,146,246 . . . may not always be needed, particularly in the case of tear-resistant plastic bags, they can be useful in keeping the multiple layers of litter 42,142,242 . . . level during shipment and use.

Once the absorbant capacity of the litter 42 of the first bag 40 is reached, the roof arms 18,20 may be swung open, the beams 50 removed and the "top" opening 44 curled or tied shut for sanitary disposal without any need for the pet owner to touch, pour or shovel the litter. In turn, the next bags 140,240 . . . are opened by uncurling their openings 144,244 . . . , are billowed upwardly and are attached in the same manner as the first. Due to the drop in level of bag 140 and subsequent bags, there are a series of ears 22 descending down the side walls 14,16 for subsequent beam insertions.

Thus, it can be seen that the litter packaging system 1 of the present invention presents both a convenient and a compact means for shipping bulk pet litter. It also provides a sanitary reusable cat litter box that allows resealable litter bags to contain a pet during its elimination process.

While the above provides a full and complete disclosure of the preferred embodiments of this invention, various modifications, alternate constructions, and equivalents may be employed without departing from the true spirit and scope of the invention. For example, it would be possible to eliminate the roof arms 18,20 by having the side flaps 14,16 tab into slots in the gables 30,32. Therefore, the above description and illustrations should not be construed as limiting the scope of the invention which is defined by the appended claims.

I claim:

1. Packaging apparatus for absorbant litter for an animal pet including:
   a box having a substantially vertical front wall and having an unexpanded position;
   a door in the front wall;
   at least one removeable bag within the box for holding litter, the bag having a preformed bag opening; and
   means for expanding the box into an expanded position and for expanding the bag to form a void within the bag of sufficient size to hold the pet, the preformed bag opening disposed within a substantially vertical plane adjacent to the door when the bag is expanded.

2. The apparatus of claim 1 further including:
   two opposed side walls of the box, each side wall having a foldable side flap at the top of the side wall, each side flap having means for attaching an attachment portion of the bag to the flap.

3. The apparatus of claim 2 further including:
   at least one beam opening in each side flap and wherein
   the attachment means includes at least one support beam having opposed end portions, each end portion pressing the attachment portion of the bag out of an associated beam opening when the box is in the expanded position.

4. The apparatus of claim 3 wherein:
   the beam openings are formed with constricted throats and the beam end portions have notches, the notches meshing with the throats when the box is in the expanded position.

5. The apparatus of claim 1 wherein:
   the litter bag includes
      a bottom opposite the preformed bag opening and a side between the bag opening and the bottom, the bag disposed on its side within the box
   and the litter is contained on a horizontal plane on the side of the bag, the plane of the litter and of the bag being generally perpendicular to the plane of the bag opening when the box is in the expanded position.

6. The apparatus of claim 5 wherein:

there are a plurality of bags disposed one above the other in parallel horizontal planes, the bags substantially filling the box when the box is in the unexpanded position.

7. The apparatus of claim 6 further including:

a deflector plate projecting inward from the door into the bag opening when the box is in the expanded position, wherein the deflector plate aids in preventing litter from being scattered out the door.

8. The apparatus of claim 7 further including:

a ramp projecting outward from the door when the box is in the expanded position.

9. The apparatus of claim 6 further including:

two opposed side walls of the box, each side wall having a foldable side flap at the top of the side wall, each side flap having at least one beam opening and wherein the expanding means includes at least one support beam having opposed end portions, each end portion pressing a portion of the bag out of an associated beam opening when the box is in the expanded position.

10. The apparatus of claim 9 further including:

a substantially vertical rear wall, the rear wall having a foldable rear gable flap at the top of the rear wall;

a foldable front gable flap at the top of the front wall; and a foldable roof arm at the top of each side flap, wherein the side flaps, roof arms and gable flaps are all folded in overlapping relationship in substantially horizontal planes when the box is in the unexpanded position and wherein the gable flaps and the side flaps are unfolded in substantially vertical planes and the roof arms are unfolded inwards toward each other and the roof arms meet in cooperating relationship to form a roof when the box is in the expanded position.

11. Packaging apparatus for absorbant litter for a pet including:

a box having a substantially vertical front wall in an unexpanded position;

at least one removeable bag within the box for holding litter having a preformed bag opening;

means for expanding the box into an expanded position, thereby enlarging the vertical front wall, and for expanding the at least one bag to form a void within the bag of sufficient size to hold the pet;

a door in the enlarged front wall when the box is in the expanded position, the preformed bag opening disposed within a substantially vertical plane adjacent to the door when the bag is expanded;

the litter bag also having a bottom opposite the preformed bag opening and a side between the bag opening and the bottom, the bag disposed on the side within the box and the litter contained on a horizontal plane on the side of the bag, the plane of the litter and of the side of the bag being generally perpendicular to the vertical plane of the bag opening when the box is in the expanded position; and two opposed side walls of the box, each side wall having a foldable side flap at the top of the side wall, each side flap having means for attaching an attachment portion of the bag to the flap.

12. The apparatus of claim 11 further including:

a deflector plate projecting inward from the door into the bag opening when the box is in the expanded position, wherein the deflector plate aids in preventing litter from being scattered out the door.

13. The apparatus of claim 12 further including:

a ramp projecting outward from the door when the box is in the expanded position.

14. The apparatus of claim 13 wherein:

the ramp has a foldable leg, the leg has a tab, and the tab of the leg is engaged with a slot in the front wall when the box is in the expanded position.

15. The apparatus of claim 14 further including:

at least one beam opening in each side flap and wherein the attachment means includes at least one support beam having opposed end portions, each end portion pressing the attachment portion of the bag out of an associated beam opening when the box is in the expanded position.

16. The apparatus of claim 15 wherein:

the beam openings are formed with constricted throats and the beam end portions have notches, the notches meshing with the throats when the box is in the expanded position.

* * * * *